US009533543B2

(12) United States Patent
Maehata et al.

(10) Patent No.: US 9,533,543 B2
(45) Date of Patent: Jan. 3, 2017

(54) MULTI-BLOWER HVAC LAYOUT FOR IMPROVED EVAPORATOR PERFORMANCE

(75) Inventors: Hiromitsu Maehata, Nagoya (JP); David Korenchuk, Royal Oak, MI (US); Delomer Gosioco, Royal Oak, MI (US); William Morris, Farmington Hills, MI (US)

(73) Assignee: Denso International America, Inc., Southfield, MI (US)

( * ) Notice: Subject to any disclaimer, the term of this patent is extended or adjusted under 35 U.S.C. 154(b) by 1143 days.

(21) Appl. No.: 13/099,566

(22) Filed: May 3, 2011

(65) Prior Publication Data

US 2012/0247710 A1 Oct. 4, 2012

Related U.S. Application Data

(60) Provisional application No. 61/468,982, filed on Mar. 29, 2011.

(51) Int. Cl.
*F28F 13/12* (2006.01)
*B60H 1/00* (2006.01)

(52) U.S. Cl.
CPC . *B60H 1/00028* (2013.01); *B60H 2001/00099* (2013.01)

(58) Field of Classification Search
CPC .............. B60H 1/00028; B60H 2001/00135; B60H 2001/0085; B60H 2001/00078; B60H 1/00085; B60H 2001/00099
USPC ...... 454/156, 159, 139, 141; 165/41, 104.34
See application file for complete search history.

(56) References Cited

U.S. PATENT DOCUMENTS

| 3,127,931 | A | * | 4/1964 | Johnson | 165/43 |
| 4,467,706 | A | * | 8/1984 | Batcheller | B01D 50/002 |
| | | | | | 165/244 |
| 4,779,672 | A | * | 10/1988 | Seikou et al. | 165/41 |
| 6,092,592 | A | * | 7/2000 | Toyoshima et al. | 165/204 |
| 6,422,309 | B2 | * | 7/2002 | Vincent | 165/204 |
| 2005/0230096 | A1 | * | 10/2005 | Yamaoka | B60H 1/03 |
| | | | | | 165/202 |
| 2010/0029192 | A1 | * | 2/2010 | Hipp-Kalthoff | B60H 1/00378 |
| | | | | | 454/159 |

FOREIGN PATENT DOCUMENTS

DE 3513952 A1 * 10/1986 ......... B60H 1/00371
GB 2212861 A * 8/1989

* cited by examiner

*Primary Examiner* — Gregory Huson
*Assistant Examiner* — Dana Tighe
(74) *Attorney, Agent, or Firm* — Harness, Dickey & Pierce, P.L.C.

(57) ABSTRACT

A climate control system of a vehicle includes an evaporator, a first blower, and a first blower passageway that receives air blown from the first blower. The system also includes a second blower and a second blower passageway that receives air blown from the second blower and that is fluidly independent of the first blower passageway. The system further includes a ducting assembly defining a common passageway that receives air from both the first and second blower passageways. The first and second blowers are configured to operate in parallel to deliver air to the common passage and across the evaporator.

21 Claims, 3 Drawing Sheets

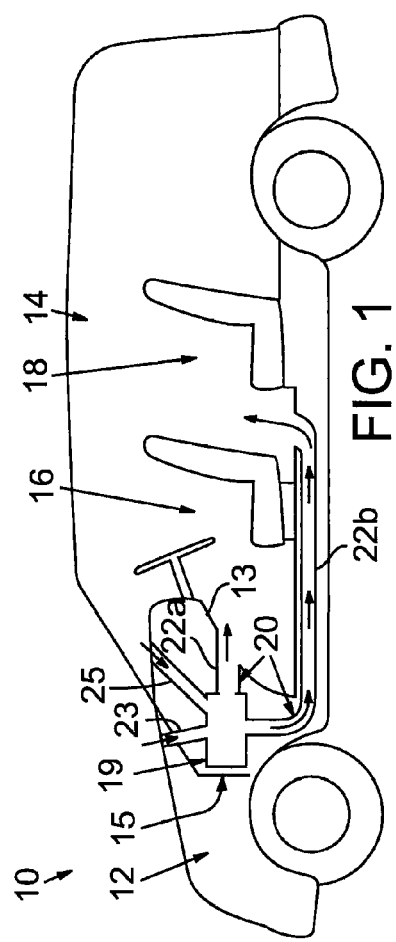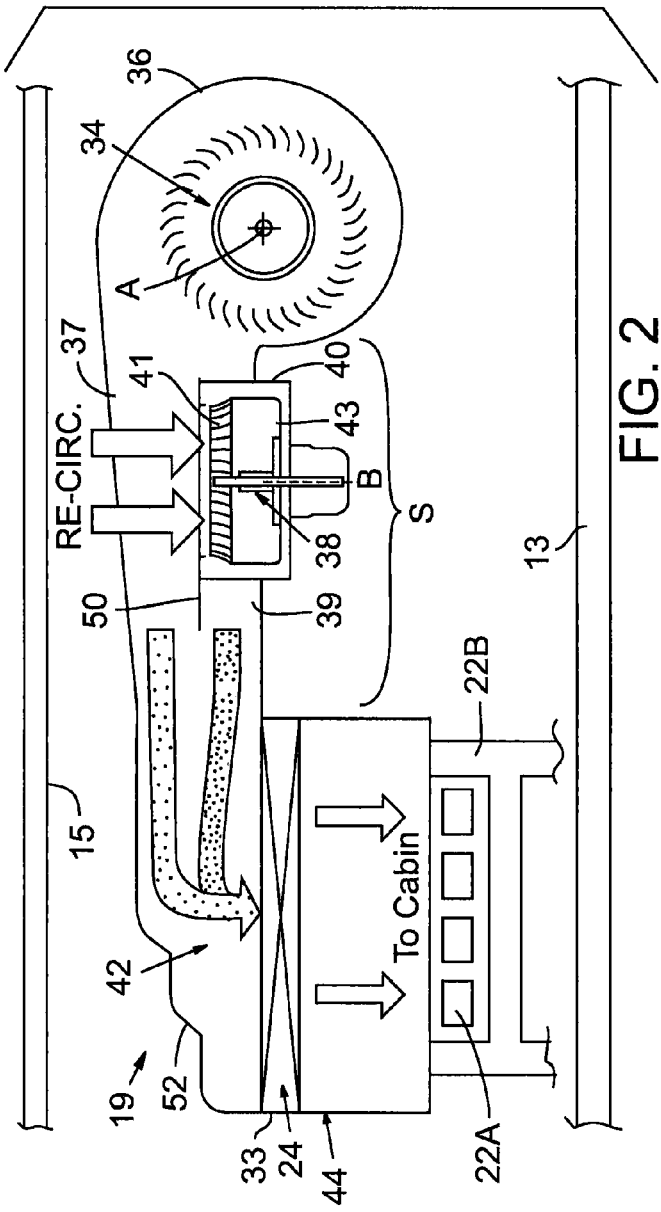

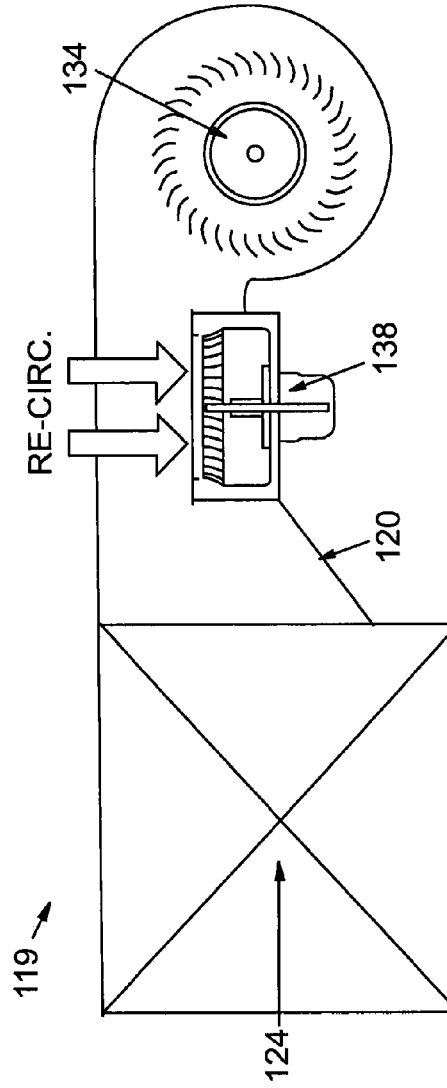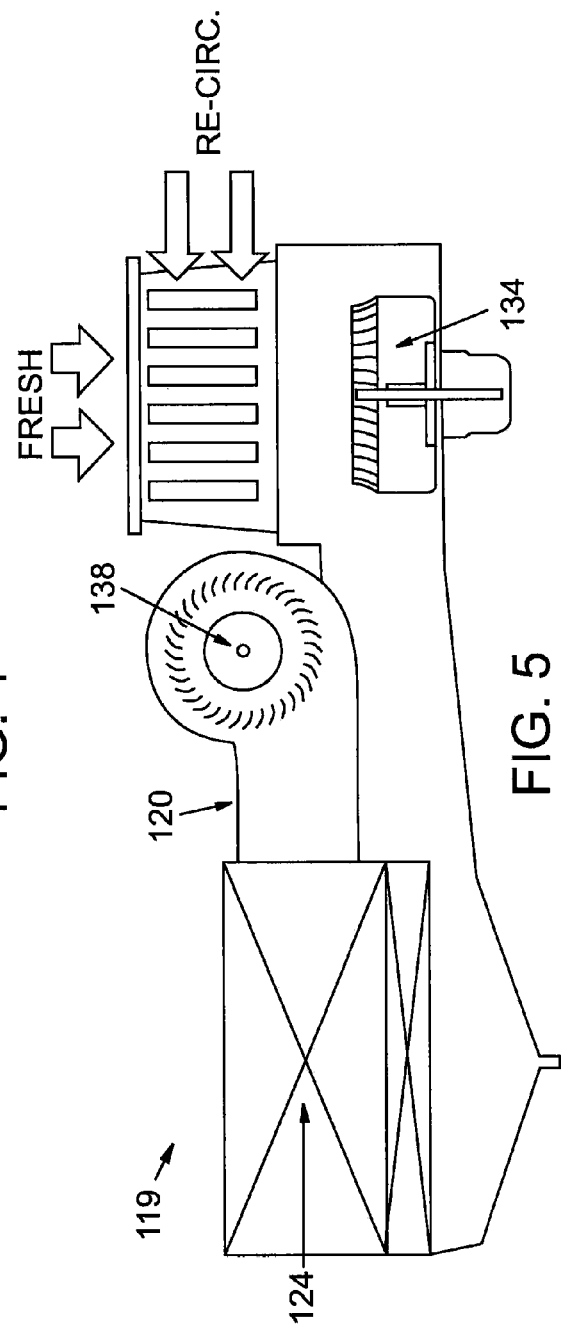

MULTI-BLOWER HVAC LAYOUT FOR IMPROVED EVAPORATOR PERFORMANCE

CROSS-REFERENCE TO RELATED APPLICATIONS

This application claims the benefit of U.S. Provisional Application No. 61/468,982, filed on Mar. 29, 2011, the entire disclosure of which is incorporated herein by reference.

FIELD

The present disclosure relates to an HVAC system and, more particularly, to a multi-blower HVAC layout for improved evaporator performance.

BACKGROUND

This section provides background information related to the present disclosure which is not necessarily prior art.

Vehicles have been equipped with air conditioning systems (HVAC systems, climate control systems, etc.) for many years. Typically, these systems include a cooling cycle with an evaporator, condenser, compressor, etc., and refrigerant flows through the cooling cycle and changes temperature through the cycle. Air can flow over an evaporator of the cooling cycle to be chilled, and this chilled air can be delivered to the passenger cabin to thereby cool the passenger cabin.

Also, these HVAC systems can include a heater core that is heated by the vehicle engine. Air can flow over the heater core to be heated, and this heated air can be delivered to the passenger cabin to thereby heat the passenger cabin.

SUMMARY

This section provides a general summary of the disclosure, and is not a comprehensive disclosure of its full scope or all of its features.

A climate control system of a vehicle is disclosed. The system includes an evaporator, a first blower, and a first blower passageway that receives air blown from the first blower. The system also includes a second blower and a second blower passageway that receives air blown from the second blower and that is fluidly independent of the first blower passageway. The system further includes a ducting assembly defining a common passageway that receives air from both the first and second blower passageways. The first and second blowers are configured to operate in parallel to deliver air to the common passage and across the evaporator.

A method of operating a climate control system of a vehicle is also disclosed. The method includes providing an evaporator, a first blower, and a second blower. Furthermore, the method includes blowing air in parallel from both the first and second blowers into a common passageway and across the evaporator.

Moreover, a climate control system of a vehicle with a passenger compartment is disclosed. The system includes an evaporator having a first region, a second region, and a refrigerant inlet that inputs refrigerant directly into the second region to flow toward the first region. The system also includes an evaporator housing that houses the evaporator and a first blower with a first axis of rotation. The first blower is configured to receive recirculated air from the passenger cabin and fresh air from outside the vehicle. Additionally, the system includes a first blower housing that houses the first blower. The first blower housing is spaced apart from the evaporator housing so as to define a space therebetween. Moreover, the system includes a second blower that is disposed within the space. The second blower has a second axis of rotation that is substantially perpendicular to the first axis of rotation. The second blower is configured to receive only recirculated air from the passenger cabin. The system further includes a ducting assembly defining a first passageway that receives air from the first blower, a second passageway that is fluidly independent of the first passageway, and a common passage fluidly connected to both the first and second passageways. The first and second blowers are configured to operate in parallel to deliver air to the common passage and across the evaporator. Airflow from the second blower is directed toward the second region of the evaporator, and airflow from the first blower is directed toward the first region of the evaporator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic illustration of a vehicle with a climate control system of the present disclosure;

FIG. 2 is a schematic top-view illustration of a portion of the climate control system according to various teachings of the present disclosure;

FIG. 4 is a schematic top-view illustration of additional exemplary embodiments of the climate control system of the present disclosure; and FIG. 5 is a schematic front-view illustration of the climate control system of FIG. 4.

Corresponding reference numerals indicate corresponding parts throughout the several views of the drawings.

DETAILED DESCRIPTION

Figure 3:
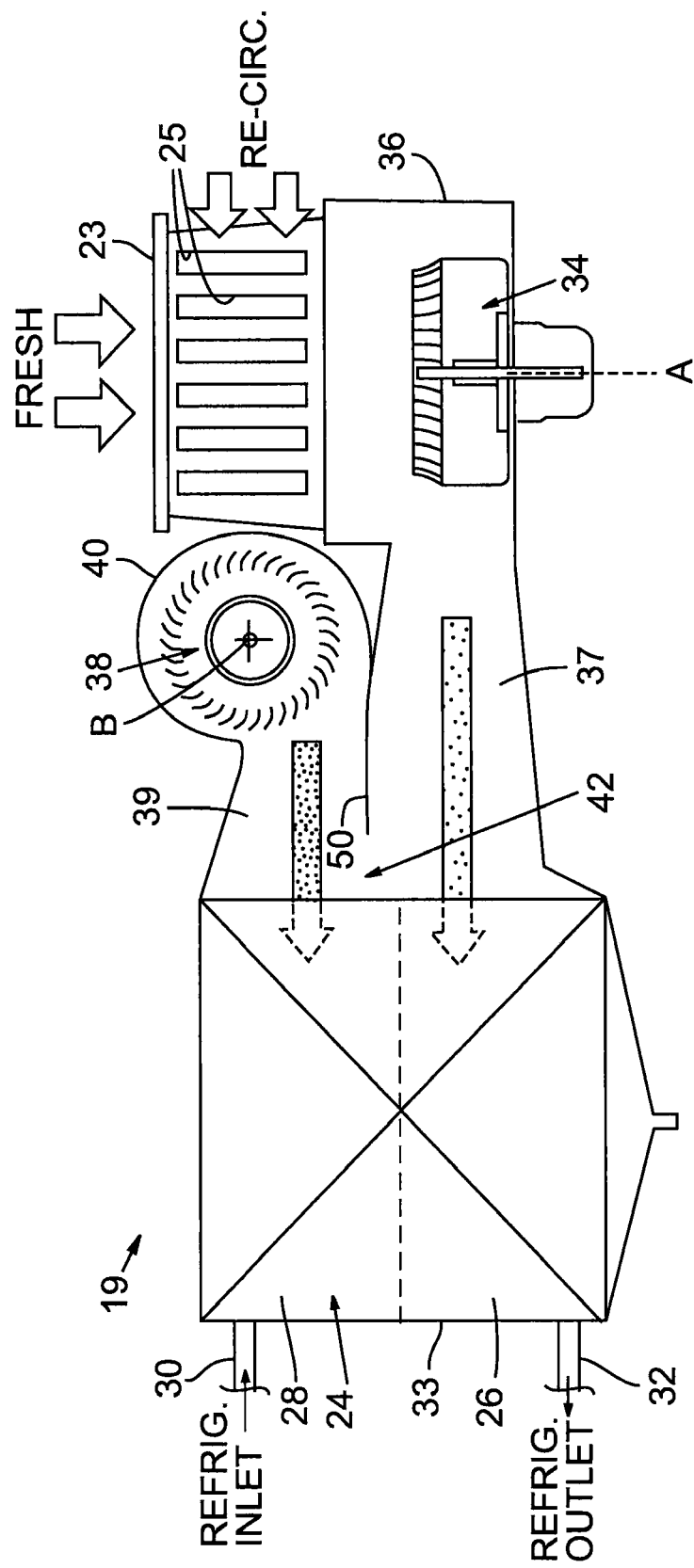
FIG. 3 is a schematic front-view illustration of the portion of the climate control system of FIG. 2.

Example embodiments will now be described more fully with reference to the accompanying drawings.

Referring initially to FIG. 1, a vehicle 10 is illustrated. The vehicle 10 can be of any suitable type. For instance, in the embodiment shown, the vehicle 10 is relatively large, such as a van, a minivan, or a sports-utility vehicle (SUV). The vehicle 10 can include an engine compartment 12 and a passenger compartment 14. The passenger compartment 14 can include a front cabin area 16 (i.e., a first cabin area) and a rear cabin area 18 (i.e., a second cabin area). The front and rear cabin areas 16, 18 can each include respective seating areas for passengers. Also, the rear cabin area 18 can include one or more cargo areas. The engine and passenger compartments 12, 14 can be separated by a dashboard 13 with user controls, etc.

The vehicle 10 can include a climate control system 19 suitable for adjusting air temperature within the passenger compartment 14. The climate control system 19 can be located in a space between the dashboard 13 and a firewall 15; however, it will be appreciated that the climate control system 19 can be located anywhere within the vehicle 10.

As will be discussed, the climate control system 19 can be very efficient. As a result, fuel economy for the vehicle can be increased.

Referring now to FIGS. 1-3, the climate control system 19 will be discussed in greater detail. The system 19 can include a ducting assembly 20 that directs airflow through the system 19. As shown in FIG. 1, the ducting assembly 20 can include one or more fresh air inlets 23 and one or more recirculated air inlets 25. The fresh air inlets 23 receive air from outside the vehicle 10, and the recirculated air inlets 25 receive air from within the passenger compartment 14. The ducting assembly 20 can also include one or more air outlets 22a, 22b. The air outlets 22a, 22b can deliver air to the passenger compartment 14. For instance, the air outlet(s) 22a can deliver air to the front cabin area 16, and the air outlet(s) 22b can deliver air to the rear cabin area 18.

As shown in FIG. 3, the system 19 can additionally include an evaporator 24 with a refrigerant inlet 30 (e.g., an inlet pipe) and a refrigerant outlet 32 (e.g., an outlet pipe). The evaporator 24 can be of a known type, and the evaporator 24 can be a component of a known cooling cycle (i.e., refrigeration cycle) that also includes a compressor, condenser, expansion valve, etc. (not specifically shown). Commercially available refrigerant can continuously flow through the cooling cycle, and the temperature and pressure of the refrigerant can change as it does so. Specifically, low temperature and low pressure refrigerant can flow (e.g., from an expansion valve) into the evaporator 24 via the inlet 30 and out of the evaporator 24 via the outlet 32. Warmer air can flow across the evaporator 24 to be chilled. The evaporator 24 can also include a first region 26 and a second region 28, which are demarcated by a broken horizontal line in FIG. 3. In general, the refrigerant inlet 30 can be attached directly to the second region 28 and spaced away from (i.e., remotely) from the first region 26. In contrast, the refrigerant outlet 32 can be attached directly to the first region 26 and spaced away from (i.e., remotely) from the second region 28. It will be appreciated that, in general, the second region 28 can be slightly colder than the first region 26 since the refrigerant is being delivered directly to the second region 28, and as the refrigerant flows from the second region 28 to the first region 26, the refrigerant can warms up slightly before exiting the evaporator 24 via the outlet 32.

The evaporator 24 can also include an evaporator housing 33. The evaporator housing 33 can be a rigid case that houses the evaporator 24 therein. The evaporator housing 33 can also include other components of the cooling or refrigeration cycle and can be referred to as an HVAC housing 44 (FIG. 2).

In some embodiments, the vehicle 10 can include only one climate control system 19, and that system 19 can include only one evaporator 24 (as well as a single condenser, compressor, expansion valve, etc.). Regardless of the fact that the system 19 includes only a single cooling cycle, the system 19 can have sufficient cooling capacity for cooling vans, minivans, SUVs, and other large vehicles. This is because the climate control system 19 can include a first blower 34 that is housed by a first blower housing 36 and a second blower 38 that is housed by a second blower housing 40, as shown in FIGS. 2 and 3.

Both blowers 34, 38 can be of a known, commercially available type. The first blower 34 can rotate about a first axis A, and the second blower 36 can rotate about a second axis B. The axes A, B can be disposed at a positive angle relative to each other. For instance, the axes A, B can be substantially perpendicular to each other.

The first blower housing 36 (i.e., the fresh/recirculation assembly) can be made out of rigid material, and the first blower 34 can be rotationally mounted therein. The first blower housing 36 can be in fluid communication with both the fresh and recirculation inlets 23, 25 such that the first blower 34 can blow fresh and/or recirculated air toward the evaporator 24. The system 19 can also include a valve (not shown) that can selectively control whether the first blower 34 blows fresh or recirculated air.

The second blower housing 40 can be made of rigid material, and the second blower 36 can be rotationally mounted therein. The second blower housing 40 can include an intake side 41 and a rear side 43. As shown in FIG. 2, the intake side 41 can be in fluid communication only with the recirculation inlet 25 such that the second blower 36 can blow only air that has been recirculated from the passenger compartment 14 toward the evaporator 24.

As shown in FIGS. 2 and 3, the ducting assembly 20 can additionally include a first blower passageway 37, a second blower passageway 39, and a common passageway 42. The first blower passageway 37 can be fluidly connected to the first blower housing 36 on one end and to the common passageway 42 on the opposite end. The second blower passageway 39 can be fluidly connected to the second blower housing 40 on one end and to the common passageway 42 on the opposite end. The common passageway 42 can be fluidly connected to the evaporator housing 33 on the end opposite to the first and second blower passageways 37, 39.

As shown, the first and second blower passageways 37, 39 can be fluidly independent of each other. For instance, a wall 50 can fluidly separate the first and second blower passageways 37, 39; however, the wall 50 can terminate at the common passageway 42. Accordingly, the first blower passageway 37 can receive air blown from the first blower 34, the second blower passageway 39 can receive air blown from the second blower 38, and the common passageway 42 (i.e., common plenum) can receive air from both the first and second blower passageways 37, 39.

As shown in FIG. 2, the common passageway 42 can include a back wall 52 that directs air toward the evaporator 24. As shown, the back wall 52 can be curved to direct the air in substantially a ninety degree angle toward the evaporator 24. In other embodiments, the common passageway 42 is relatively straight.

The evaporator 24 can be disposed and centered within the evaporator housing 33 such that all air from the common passageway 42 must pass over the evaporator 24. In the embodiments of the FIGS. 2 and 3, the evaporator 24 can be disposed generally in a vertical orientation relative to the wheelbase of the vehicle 10. Assuming that the evaporator 24 is running, the air passing over the evaporator 24 will be chilled by the evaporator 24. The evaporator housing 33 can also be fluidly connected to the air outlets 22a, 22b (FIG. 1) such that the chilled air can be passed to the passenger compartment 14 of the vehicle 10.

Thus, the first and second blowers 34, 38 can operate in parallel to deliver air to the common passageway 42 and across the evaporator 24. In other words, the first blower 34 can blow fresh and/or recirculated air into the common passageway 42, and the second blower 38 can blow recirculated air into the common passageway 42 independently. Air from each blower 34, 38 can be blown across the same evaporator 24.

Moreover, airflow paths from the first and second blowers 34, 38 can be configured to increase cooling efficiency. Although air from the blowers 34, 38 is likely to partially mix within the common passageway 42, the first and second blower passageways 37, 39 are configured such that airflow from the first blower 34 is directed primarily across the first region 26 of the evaporator 24 and airflow from the second blower 38 is directed primarily across the second region 28 of the evaporator 24. This can increase cooling capacity of the system 19 since the second blower 38 blows only recirculated air and blows air across the colder region (the second region 28) of the evaporator 24.

Moreover, the placement of the second blower 38 can allow the system 19 to be more compact. As shown in FIG. 2, the first blower 34 and first blower housing 36 can be spaced apart from the evaporator 24 to define a space S therebetween, and the second blower 38 and second blower housing 40 can be disposed within the space S. The intake side 41 of the second blower 38 can face toward the firewall 15, toward the front of the vehicle 10, and the rear side 43 of the second blower 38 can face the dashboard 13 of the vehicle 10. Because of this placement, the second blower 38 can be relatively easy to access (e.g., should the second blower 38 malfunction, etc.). Furthermore, noise levels from the first and second blowers 34, 38 can be relatively low because both blowers 34, 38 are located behind the dashboard 13.

Referring now to FIGS. 4 and 5, the climate control system 119 is illustrated according to additional embodiments. Components that correspond with those of the embodiments of FIGS. 2 and 3 are indicated with corresponding reference numbers increased by 100.

The climate control system 119 can be substantially similar to the embodiments of FIGS. 2 and 3. Thus, the system 119 can include first and second blowers 134, 138 that operate in parallel to blow air through the ducting assembly 120 to the evaporator 124. Unlike the embodiments of FIGS. 2 and 3, the evaporator 124 can be oriented substantially horizontally relative to the wheelbase of the vehicle 10. Like the embodiments of FIGS. 2 and 3, the system 119 can have high cooling capacity despite including only one evaporator 124 due to the configuration of the first and second blowers 134, 138 and the ducting assembly 120.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A climate control system of a vehicle, the climate control system comprising:
   an evaporator;
   a first blower having a first rotation axis;
   a first blower passageway that receives air blown from the first blower;
   a second blower having a second rotation axis, the second blower interposed between the evaporator and the first blower and arranged on a straight line extending between the first rotation axis of the first blower and a center of the evaporator;
   a second blower passageway that receives air blown from the second blower and that is fluidly independent of the first blower passageway; and
   a ducting assembly defining a common passageway that receives air from both the first and second blower passageways, the first and second blowers configured to operate in parallel to deliver air to the common passage and across the evaporator.

2. The climate control system of claim 1, further comprising a first blower housing that houses the first blower and an evaporator housing that houses the evaporator, the ducting assembly fluidly connecting the first blower housing and the evaporator housing, a space defined between the first blower housing and the evaporator housing, the second blower being disposed within the space between the first blower housing and the evaporator housing.

3. The climate control system of claim 1, wherein the vehicle includes a passenger compartment, and wherein the second blower receives only recirculated air from the passenger compartment.

4. The climate control system of claim 3, wherein the evaporator includes a first region, a second region, and a refrigerant inlet that inputs refrigerant into the evaporator, the refrigerant inlet being attached directly to the second region and spaced away from the first region, wherein airflow from the second blower is directed toward the second region of the evaporator, and wherein airflow from the first blower is directed toward the first region of the evaporator.

5. The climate control system of claim 3, wherein the vehicle includes a passenger compartment, and wherein the first blower is configured to receive recirculated air from the passenger compartment and fresh air from outside the vehicle.

6. The climate control system of claim 1, wherein the first and second rotation axes are disposed at a positive angle relative to each other.

7. The climate control system of claim 6, wherein the first and second rotation axes are disposed substantially perpendicular to each other.

8. The climate control system of claim 1, wherein the vehicle includes a front end and a passenger compartment, wherein the second blower has an intake side facing the front end of the vehicle, and wherein the second blower has a rear side facing the passenger compartment.

9. The climate control system of claim 1, wherein the first and second axes of rotation are disposed at a positive angle relative to each other.

10. The climate control system of claim 9, wherein the first and second axes of rotation are disposed substantially perpendicular to each other.

11. The climate control system of claim 1, wherein the first blower is spaced from the evaporator to define a blower space, the second blower being disposed within the blower space.

12. The climate control system of claim 1, wherein the second blower at least partially overlaps the first blower passageway when being viewed along the first rotation axis of the first blower.

13. The climate control system of claim 1, wherein the second blower has an intake side in communication with an inlet and the intake side overlaps with the first blower passageway when viewed along the first rotation axis of the first blower.

14. The climate control system of claim 1, wherein the second blower has an intake side and a rear side opposite to the intake side, the intake side faces a firewall on a front side of the vehicle and the rear side faces a dashboard on a rear side of the vehicle.

15. The climate control system of claim 1, wherein the entire second blower is interposed between the evaporator and the first blower.

16. A climate control system of a vehicle with a passenger compartment comprising:
   an evaporator having a first region, a second region, and a refrigerant inlet that inputs refrigerant directly into the second region to flow toward the first region;
   an evaporator housing that houses the evaporator;
   a first blower with a first axis of rotation, the first blower configured to receive recirculated air from the passenger cabin and fresh air from outside the vehicle;
   a first blower housing that houses the first blower, the first blower housing being spaced apart from the evaporator housing so as to define a space therebetween;
   a second blower that is interposed between the evaporator and the first blower within the space, the second blower having a second axis of rotation that is substantially perpendicular to the first axis of rotation, the second blower configured to receive only recirculated air from the passenger cabin, the second blower arranged on a straight line extending between the first rotation axis of the first blower and a center of the evaporator; and
   a ducting assembly defining a first passageway that receives air from the first blower, a second passageway that is fluidly independent of the first passageway, and a common passage fluidly connected to both the first and second passageways, the first and second blowers configured to operate in parallel to deliver air to the common passage and across the evaporator, airflow from the second blower being directed toward the second region of the evaporator, and airflow from the first blower being directed toward the first region of the evaporator; wherein
   the second blower has an intake side and a rear side opposite to the intake side, the intake side faces a firewall on a front side of the vehicle and the rear side faces a dashboard on a rear side of the vehicle.

17. The climate control system of claim 16, wherein the vehicle includes a front end and a passenger compartment, wherein the second blower has an intake side facing the front end of the vehicle, and wherein the second blower has a rear side facing the passenger compartment.

18. The climate control system of claim 16, wherein the second blower at least partially overlaps the first blower passageway when being viewed along the first axis of rotation of the first blower.

19. The climate control system of claim 16, wherein the intake side overlaps with the first blower passageway when viewed along the first axis of rotation of the first blower.

20. The climate control system of claim 16, wherein the entire second blower is interposed between the evaporator and the first blower.

21. A climate control system of a vehicle comprising:
   an evaporator;
   a first blower having a first rotation axis;
   a first blower passageway that receives air blown from the first blower;
   a second blower;
   a second blower passageway that receives air blown from the second blower and that is fluidly independent of the first blower passageway, the second blower having a second rotation axis; and
   a ducting assembly defining a common passageway that receives air from both the first and second blower passageways, the first and second blowers configured to operate in parallel to deliver air to the common passage and across the evaporator;
   wherein:
      the second blower at least partially overlaps the first blower passageway when being viewed along the first rotation axis of the first blower, the second blower arranged on a straight line extending between the first rotation axis of the first blower and a center of the evaporator; and
      the second blower has an intake side in communication with an inlet and the intake side overlaps with the first blower passageway when viewed along the first rotation axis of the first blower.

* * * * *